July 22, 1958     M. C. LUCKHURST     2,844,087

COFFEE MAKER

Filed Dec. 21, 1955

INVENTOR.
Marie C. Luckhurst
BY
ATTORNEY

United States Patent Office 2,844,087
Patented July 22, 1958

2,844,087

COFFEE MAKER

Marie C. Luckhurst, Sioux Falls, S. Dak.

Application December 21, 1955, Serial No. 554,574

2 Claims. (Cl. 99—285)

My invention relates to a coffee maker.

An object of my invention is to provide a coffee maker in which the metal in the coffee maker or pot will not contact the coffee in any way during the brewing process or during the pouring process.

A further object of my invention is to provide a coffee maker which is sturdy in construction and which includes simplified features.

Figure 1:
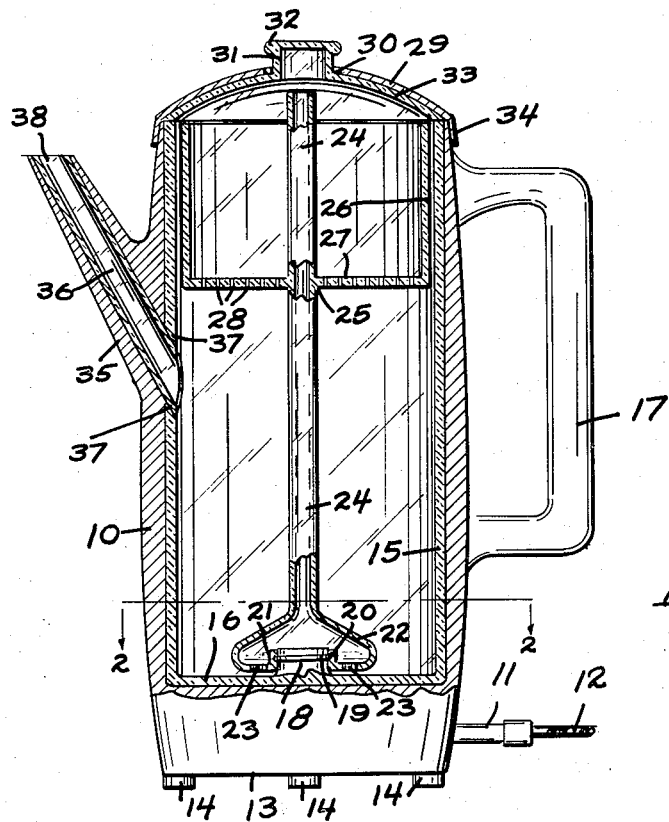
Figure 2:
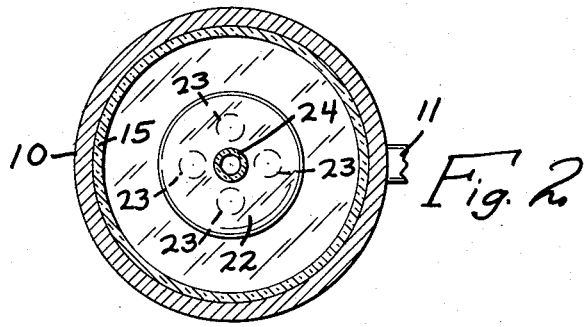
Figure 3:
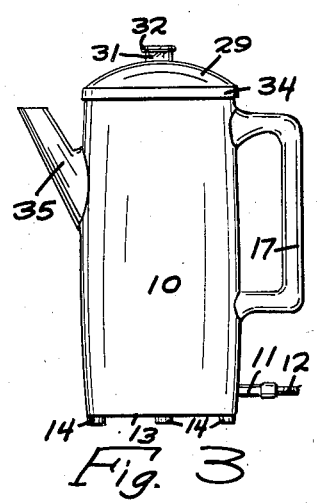

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a sectional view taken generally along the vertical axis of the coffee maker, Figure 2 is a sectional view taken along the lines 2—2 of Figure 1, and Figure 3 is a side external elevation of the coffee maker.

My invention pertains to the construction of a coffee pot or coffee maker in which the inside of the coffee maker is completely covered with glass portions so that the coffee itself cannot contact the metal exterior, the metal exterior providing a protecting medium as well as providing means for insuring any type of ornamental exterior appearance. I have found that coffee makers of the metallic type and which include metal interiors must be cleaned often in order to prevent the deleterious effects which are otherwise caused through chemical action, and my invention therefore contemplates the provision of a coffee maker including a complete glass interior without metallic parts to provide a variety of advantages such as better coffee, coffee which remains heated over a longer period of time, and certain other advantages which will be apparent.

In explaining the coffee maker of my invention, I have used the character 10 to designate the outer metallic shell of the coffee pot itself, the electric kind being preferably shown, it being understood that a suitable electric element will be included at the base of the member 10, the character 11 indicating a suitable electric plug, the character 12 indicating the twin wire passing to a suitable socket.

The shell 10 which is substantially cylindrical in shape, but which can include the curved configuration substantially as shown, includes the base 13 to which is attached the small heat insulating posts 14.

Engaging the inside of the substantially cylindrical portion 10 is a cylindrical glass member 15 having a bottom wall 16, this glass having suitable properties of requisite toughness and other desired characteristics. Attached to the shell 10 is the handle 17 which is preferably made of suitable non heat conductive material.

Formed integrally with the bottom wall 16 is a boss 18 including a thread 19 molded thereon, which thread is adapted to engage a suitable further thread 20 in the portion 21, which portion 21 continues into the further portion 22 which is slightly spaced above the bottom wall 16, the portions 21 and 22 being made of glass also and including the openings 23 to allow the liquid to percolate therethrough, the portion 22 extending into the vertical hollow stem 24 which is integrally formed at 25 with the further cylindrical glass cup 26 having the bottom wall 27, which bottom wall 27 includes the openings 28, it thus being noted that this entire structure is made of glass, the stem 24 continuing upwardly as shown toward the lid. The lid itself includes the metallic cover 29 having an opening 30 for the reception of the cylindrical glass portion 31 having the hand grasping extension 32, the member 21 merging integrally with the substantially sphere segment portion 33 which is secured beneath the metallic lid 29, the metallic member 29 merging integrally with the annular flange 34 which snugly receives the top of the cylindrical member 10 and to thereby secure the lid until removed.

The metallic exterior 10 merges with the substantially cylindrical spout portion 35, and received within the spout portion 35 is a hollow glass tube 36 which is joined at 37 to the glass insert member 15, the tube 36 including the upper opening at 38.

It will now be noted in using the coffee maker that the coffee itself can be placed in the upper receptacle 26, the heat being turned on and the coffee pot functioning in the usual manner, with the boiling liquid passing up through the tube 24 and thence passing downwardly through the coffee and through the openings 28. It will be noted throughout the entire process that none of the coffee will ever contact any of the metal, and it will be further noted that the upper member 31 is transparent to show the color of the percolating coffee. When the brewed coffee is poured through the tube 36, it will also be noted that there is no contact with any metallic portions. The lower structure of the stem 24 which includes the members 22 etc. permits the inner glass unit to be placed upon a table in a vertical position, and it will also be obvious that other methods of locking this assembly to the bottom could be used, this locking being an important feature in that it maintains the parts in correct alignment when in the coffee maker, the arrangement being readily removed by a simple rotary motion. It will also be obvious that the stem and the attendant parts 26 etc. can be readily cleaned.

It will now be seen that I have provided the advantages mentioned in the objects of my invention with various other advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A coffee maker comprising a metal exterior body including a metal spout portion, a glass insert enclosed by said metal body, said insert being adapted to cover all of the interior portions of said metal body to prevent contact of brewed coffee with any portion of said metal body, said insert including a cylindrical hollow liquid-receiving member snugly engaging the interior of said metal body, a glass tube communicating directly to said liquid-receiving member, said glass tube passing through said spout portion and extending to the discharge end of said spout portion, a glass stem, a glass coffee-receiving cup formed integrally with said stem and having a plurality of lower openings in its bottom wall, means for securing said glass stem to the base of said liquid-receiving member, a metal lid, said lid including a glass lid portion attached to the interior thereof, said metal lid having a central opening, said glass lid portion including a cylindrical portion extending upwardly therefrom to visually determine the condition of coffee in said coffee maker.

2. A coffee maker comprising a metal exterior body including a metal spout portion, a glass insert enclosed by said metal body, said insert being adapted to cover all of the interior portions of said metal body to prevent contact of brewed coffee with any portion of said metal body, said insert including a cylindrical hollow liquid-receiving member snugly engaging the interior of said metal body, a glass tube communicating directly to said liquid-receiving member, said glass tube passing through said spout portion and extending to the discharge end of said spout portion, a glass stem, a glass coffee-receiving cup formed integrally with said stem and having a plurality of lower openings in its bottom wall, means for securing said glass stem to the base of said liquid-receiving member, a metal lid, said lid including a glass lid portion attached to the interior thereof, said metal lid having a central opening, said glass lid portion including a cylindrical portion extending upwardly therefrom to visually determine the condition of coffee in said coffee maker, said stem including a lower expanded portion havings openings, said expanded portion including a thread, said hollow liquid-receiving member including an upwardly extending glass boss at the bottom thereof, said boss having a further thread engaging said thread.

References Cited in the file of this patent

UNITED STATES PATENTS

| | | |
|---|---|---|
| 893,209 | Warner | July 14, 1908 |
| 1,306,688 | Downham | June 17, 1919 |
| 1,472,901 | Brenner et al. | Nov. 6, 1923 |
| 2,190,522 | Pagliuco | Feb. 13, 1940 |
| 2,283,734 | Hoffeld et al. | May 9, 1942 |

FOREIGN PATENTS

| | | |
|---|---|---|
| 450,427 | Great Britain | July 17, 1936 |